(12) United States Patent
Ohlbach et al.

(10) Patent No.: US 6,815,388 B1
(45) Date of Patent: Nov. 9, 2004

(54) METHOD FOR ACTIVATING PASSIVATED IRON

(75) Inventors: Frank Ohlbach, Dossenheim (DE); Rolf Fischer, Heidelberg (DE); Hermann Luyken, Ludwigshafen (DE); Johann-Peter Melder, Böhl-Iggelheim (DE); Martin Merger, Frankenthal (DE); Andreas Ansmann, Wiesloch (DE); Peter Bassler, Viernheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 228 days.

(21) Appl. No.: 10/088,406

(22) PCT Filed: Sep. 15, 2000

(86) PCT No.: PCT/EP00/09020

§ 371 (c)(1),
(2), (4) Date: Mar. 19, 2002

(87) PCT Pub. No.: WO01/24925

PCT Pub. Date: Apr. 12, 2001

(30) Foreign Application Priority Data

Oct. 1, 1999 (DE) .......................................... 199 47 508

(51) Int. Cl.⁷ .......................... B01J 38/08; B01J 38/10; B01J 20/34

(52) U.S. Cl. ............................................ 502/54; 502/53
(58) Field of Search ...................................... 502/53, 54

(56) References Cited

U.S. PATENT DOCUMENTS

| | | | |
|---|---|---|---|
| 3,758,584 A | 9/1973 | Bivens | 260/583 K |
| 4,480,051 A | 10/1984 | Wu | 502/338 |
| 4,758,546 A | 7/1988 | Baer | 502/337 |
| 5,908,805 A * | 6/1999 | Huser et al. | 502/53 |

FOREIGN PATENT DOCUMENTS

| | | |
|---|---|---|
| CA | 2265513 | 3/1998 |
| DE | 855 263 | 7/1949 |
| WO | 99/15497 | 4/1999 |

OTHER PUBLICATIONS

Appl. Cat., 25(1986) 313–333, Geus.
J. Mat. Sci. Lts. 8(1989) 895–898, Sasa et al.
Ammonia Synthesis 112–115, (1974) Edited by Slack et al. Part II and Part III.

* cited by examiner

*Primary Examiner*—Stanley S. Silverman
*Assistant Examiner*—Jonas N. Strickland
(74) *Attorney, Agent, or Firm*—Keil & Weinkauf

(57) ABSTRACT

Passivated iron useful as catalytically active component after activation is activated by hydrogen at elevated temperature and elevated pressure in the presence of a nitrile.

7 Claims, No Drawings

METHOD FOR ACTIVATING PASSIVATED IRON

The present invention relates to a process for hydrogen activation of passivated iron useful as catalytically active component after said activation at elevated temperature and elevated pressure, which comprises effecting said activation in the presence of a nitrile at from 20 to 180° C.

Catalysts consisting wholly or substantially of elemental iron are very important, for example for the synthesis of ammonia from nitrogen and hydrogen, for producing hydrocarbons from synthesis gas (Fischer-Tropsch synthesis) and for the hydrogenation of nitriles to amines (J.W. Geus, Applied Catalysis 25, 313–333 (1986)).

Such catalysts are usually prepared by reducing iron oxides with hydrogen. To this end, the iron oxide is reduced in a hydrogen stream at high temperatures, the oxide oxygen being converted into water and removed in that form.

DP patent 855,263 describes the reduction of molten and subsequently comminuted iron oxide at 400° C. in a hydrogen stream.

J. Mater. Sci. Lett. 8 (8) (1989), 895–898 reports the experimental finding that the complete reduction of iron oxides to iron in a hydrogen stream can only be achieved at temperatures above 400° C. and that the reduction of doped iron oxides as used in ammonia synthesis can be achieved only at above 500° C.

U.S. Pat. No. 3,758,584 discloses at column 1 lines 47 to 65 reducing iron oxides at 300 to 600° C. in the presence of 0.01 to 10 percent by volume of ammonia. Preference is given to a temperature of 350 to 420° C., in which case the hydrogen contains 0.25–3 percent by volume of ammonia (column 2 lines 12–18). Such iron catalysts are used for example for hydrogenating adiponitrile to hexamethylenediamine.

According to U.S. Pat. No. 4,480,051, the reduction can also be carried out in three stages by reducing the iron oxide with hydrogen or mixtures of hydrogen and ammonia in a first step, then treating the resulting elemental iron with an oxygen-containing gas in a second step and then as third step repeating the reduction similarly to the first step.

The reduced iron catalyst obtained according to the processes mentioned is pyrophoric. If the reduction of the iron oxide was carried out directly in the synthesis reactor contemplated for the later reaction, the catalyst can subsequently be used for the contemplated chemical reaction. However, the reduction in the synthesis reactor has disadvantages: since the reduction together with the heating and cooling takes many hours, the reactor is unavailable for manufacture during this period. In addition, the reduction temperature can be distinctly above the later synthesis temperature. So the reactor has to be overengineered because of the reduction.

It can therefore be advantageous to reduce the iron oxide outside the contemplated synthesis reactor. However, the pyrophoric catalyst has to be passivated by treatment with air in order that it may be transported to the synthesis reactor and installed.

According to WO 98/11059, this passivation may be effected with nitrogen-oxygen mixtures at temperatures from 20 to 80° C., preferably 25 to 60° C. The activation of such catalysts ("reduced/passivated") is then effected in the synthesis reactor in a hydrogen atmosphere at from 180 to 500° C., preferably from 200 to 400° C.

Activation for the purposes of the present invention is conversion of reducedly [sic]/passivated iron into a catalytically active form.

The disadvantage is that even the subsequent activation in the reactor necessitates high temperatures in the range from 200 to 400° C. This leads to appreciable extra costs on account of the increased equipment needs (preheater, cycle gas compressor, reactor material, etc.). Also, although the time needed for the activation is less than with the initial reduction of the iron oxide, it is still high. For instance, A. V. Slack, G. R. James: Ammonia, Part II, Marcel Dekker Inc., 1977, 113–114 describes the procedure for activating a passivated iron used in ammonia synthesis. The activation takes place at from 300 to 480° C. and takes about 17 hours, to which has to be added the same time for heating the reactor.

DE-A-3,524,330 describes the activation of passivated iron in the presence of a Redox system, eg ketone/alcohol, at temperatures of about 200° C. The disadvantages here are the high temperature and the appreciable time required for the activation.

It is an object of the present invention to provide a process for a technically simple and economical elevated temperature, elevated pressure hydrogen activation of passivated iron useful as catalytically active component after the activation without the disadvantages mentioned.

We have found that this object is achieved by the process defined at the outset.

The passivated iron which is used in the process of the invention and which is useful as catalytically active component after the activation can be obtained according to processes known per se.

Useful precursors for such an iron accordingly include iron oxides, iron hydroxides, iron oxyhydroxides or mixtures thereof (component a). Examples include iron(III) oxide, iron(II, III) oxide, iron(II) oxide, iron(II) hydroxide, iron(III) hydroxide or iron oxyhydroxide such as FeOOH. Synthetic or naturally occurring iron oxides, iron hydroxides or iron oxyhydroxides can be used, such as magnetite, which has the idealized formula of $Fe_3O_4$, brown ironstone, which has the idealized formula of $Fe_2O_3 \times H_2O$, or red ironstone (hematite), which has the idealized formula of $Fe_2O_3$.

Such compounds can be used to produce supported iron catalysts, but are preferably used for producing unsupported iron catalysts.

Useful precursors for such an iron include as component a) readily water-soluble salts of iron, such as nitrates, chlorides, acetates, formates or sulfates, preferably nitrates, or mixtures thereof, and also mixtures of such salts with the aforementioned iron oxides, iron hydroxides or iron oxyhydroxides.

Such compounds can be used to produce unsupported iron catalysts, but are preferably used for producing supported iron catalysts.

The passivated iron which is used in the process of the invention and which is useful as catalytically active component after activation may include further components, such as promoters.

Advantageous promoters are one or more of the following elements or compounds based on the following elements or mixtures thereof (component (b)):

palladium, cobalt, ruthenium, rhodium, platinum, iridium, osmium, copper, silver, gold, chromium, molybdenum, tungsten, manganese, rhenium, zinc, cadmium, lead, aluminum, tin, phosphorus, arsenic, antimony, bismuth and rare earth metals, silicon, zirconium, vanadium, titanium.

Advantageous further components (component (c)) are one or more compounds based on one or more alkali or alkaline earth metals.

To prepare the passivated iron useful as catalytically active component after activation, the precursor of component (a) may already contain component (b) or its precursors partially or completely. Similarly, to prepare the passivated iron useful as catalytically active component after activation the precursor of component (a) may already contain component (c) or its precursors partially or completely.

Preferred precursors for component (b) include readily water-soluble salts or complexes of the elements mentioned, such as nitrates, chlorides, acetates, formates, sulfates, preferably nitrates.

Preferred precursors for component (c) include readily water-soluble salts or complexes of the elements mentioned, such as hydroxides, carbonates, nitrates, chlorides, acetates, formates, sulfates, preferably hydroxides and carbonates.

Catalyst precursors including passivated iron useful as catalytically active component after activation with or without component (b) or (c) or components (b) and (c) are useful as precursors for supported or unsupported catalysts.

Such supported catalysts may include conventional carrier materials, preferably aluminum oxide, silicon oxide, alumosilicates, lanthanum oxide, titanium dioxide, zirconium dioxide, magnesium oxide, zinc oxide, zeolites or activated carbon and also mixtures thereof.

In a general embodiment for producing catalyst precursors, precursors of component (a) are precipitated if desired together with precursors of component (b) and if desired with precursors of component (c) in the absence or, in the case of supported catalysts, in the presence of carrier materials, if desired the catalyst precursor thus obtained is processed into extrudates or tablets, dried and subsequently calcined.

The precipitation from generally aqueous solutions may be effected in a conventional manner, for example by addition of precipitating reagents, by changing the pH or by changing the temperature.

Supported catalysts are generally also obtainable by saturating a carrier material with a solution of component (a), if desired component (b) and if desired component (c), the individual components being added simultaneously or in succession, or by spraying the components (a), if desired component (b) and if desired component (c) onto a carrier material in a conventional manner.

The catalyst precursor material thus obtained may be predried in a conventional manner, generally at from 80 to 150° C., preferably at from 80 to 120° C.

This is generally followed by a calcination. The calcining is customarily effected at from 150 to 500° C., preferably at from 200 to 450° C., in a gas stream, for example an air stream or a nitrogen stream.

The catalyst precursors including passivated iron useful as catalytically active component after activation may also be obtained by melting iron-containing oxides, hydroxides or oxyhydroxides or mixtures of such compounds at above 1500° C. These iron-containing starting compounds may already include component (b) or component (c). It is similarly possible if desired to add component (b) or component (c) or components (b) and (c).

After calcination, the catalyst precursor material is generally exposed to a reducing atmosphere. This is preferably done by exposing the catalyst precursor material to a gas atmosphere containing molecular hydrogen and if desired further gases, especially inert gases, such as nitrogen, at from 200 to 500° C., preferably at from 250 to 450° C. The reaction times are generally within the range from 2 to 72 hours. The space velocity over the catalyst precursor in this operation is preferably in the range from 100 to 500 standard 1/1 of catalyst precursor×hour, the space velocity over the ammonia synthesis catalyst precursor is preferably in the range from 2000 to 10,000 standard 1/1 of catalyst precursor×hour.

The catalyst precursor including metallic iron is generally passivated at from 20 to 100° C., preferably at from 25 to 60° C. An advantageous way of doing this is to contact the catalyst precursor with an oxidizing gas, preferably with a gas containing molecular oxygen, especially with a mixture of nitrogen and oxygen.

To prepare a passivated catalyst including iron useful as catalytically active component after activation, the invention provides that the catalyst precursor be activated with hydrogen at from 20 to 180° C. and at elevated pressure in the presence of a nitrile.

The hydrogen may be used as pure gas or as a gas containing further constituents, such as inert gas, for example nitrogen or argon, especially nitrogen.

The activation of the catalyst precursor may be effected with advantage in the reactor in which the catalyst is used after activation. To this end, the catalyst precursor may be disposed as a fixed bed in the reactor or be suspended in the reactor in a solvent.

Useful nitrites include in principle all nitrites individually or mixed, ie organic compounds which contain at least one, preferably more than one, such as two, three or four, nitrile groups which are reactive in the process of the invention, such as aromatic nitrites, ie nitrites in which the nitrile group is directly attached to an aromatic or arylaliphatic, for example benzonitrile, o-aminobenzonitrile or phthalonitrile, or aliphatic nitriles, ie nitriles in which the nitrile group is directly attached to an aliphatic system or to the aliphatic moiety of an arylaliphatic.

The aromatic or aliphatic nitrites may bear one or more, such as two, three or four, further identical or different functional groups, such as amino groups or ester groups.

Useful aliphatic nitriles are aliphatic nitrites of from 1 to 20 carbon atoms, reckoned without the nitrile group or groups and with the aliphatic system being linear, branched or cyclic, such as linear nitriles having one nitrile group, for example acetonitrile or propionitrile, cyclic nitrites having one nitrile group, for example cyclohexyl nitrile, linear nitrites having one nitrile group and a further functional group, for example cyanoacetic esters or 6-aminocapronitrile, such as linear nitriles having two nitrile groups, for example 2-methylglutaronitrile, adiponitrile or succinonitrile.

It will be appreciated that mixtures of a plurality of nitriles may also be used.

The preparation of such nitriles is known per se.

When the catalyst precursor is disposed as a fixed bed in a reactor, the activation may be carried out continuously or batchwise in downward or upward flow. According to the invention, the temperature is in the range from 20 to 180° C., especially from 30 to 150° C. The pressure should advantageously be in the range from 2 to 40 MPa, especially from 3 to 30 MPa.

The activation may preferably be carried out in the presence of an inorganic solvent, such as ammonia, or of an organic solvent, such as an amine, diamine or triamine, preferably of from 1 to 6 carbon atoms, for example trimethylamine, triethylamine, tri-n-propylamine, tri-i-propylamine, tributylamine, such as an alcohol, for example methanol, ethanol, n-propanol, i-propanol, n-butanol, i-butanol, s-butanol, preferably ammonia.

In a preferred embodiment, from 1 to 10 g, preferably from 2 to 6 g, of solvent, especially ammonia, may be used per g of nitrile.

The space velocity over the catalyst precursor is advantageously in the range from 0.1 to 2.0 kg, especially from 0.3 to 1.0 kg, of nitrile/l×h.

When the catalyst precursor is used in the form of a suspension in a solvent, the activation may be carried out batchwise or preferably continuously in the liquid phase in particular. The temperature should advantageously be in the range from 20 to 180° C., preferably from 40 to 150° C., especially from 50 to 100° C. The pressure should advantageously be in the range from 2 to 40 MPa, preferably from 2 to 30 MPa, particularly preferably from 3 to 30 MPa, especially from 4 to 9 MPa. The residence time should advantageously be in the range from 50 to 275 min, preferably from 70 to 200 min.

The activation may preferably be carried out in the presence of an inorganic solvent, such as ammonia, or of an organic solvent, such as an amine, diamine or triamine, preferably of from 1 to 6 carbon atoms, for example trimethylamine, triethylamine, tri-n-propylamine, tri-i-propylamine, tributylamine, such as an alcohol, for example methanol, ethanol, n-propanol, i-propanol, n-butanol, i-butanol, s-butanol, preferably ammonia.

In a preferred embodiment, the nitrile concentration is in the range from 10 to 90% by weight, preferably from 30 to 80% by weight, especially from 40 to 70% by weight, based on the sum total of nitrile and solvent.

In a preferred embodiment, the amount of catalyst precursor, based on the amount of nitrile, is in the range from 1 to 50% by weight, especially from 5 to 20% by weight.

The nitrites used in the process of the invention are generally obtained partly as amines and partly as carboxamides after the activation.

The course of the activation may be followed in a conventional manner, for example by gas chromatographic analysis of the reaction effluent in the case of a continuous process or gas chromatographic analysis of samples of the reaction mixture in the case of a batchwise process.

Particularly advantageous catalytically active iron obtainable by the process according to the invention includes from 0 to 25% by weight of component (b), based on component (a), and from 0 to 10% by weight of component (c), based on component (a).

Optimum parameters for obtaining the desired composition are simple to determine in a few preliminary experiments.

The iron obtainable by the process according to the invention is useful in numerous chemical processes, for example the synthesis of ammonia from nitrogen and hydrogen, the production of hydrocarbons from synthesis gas (Fischer-Tropsch synthesis) or in hydrogenations, such as the hydrogenation of nitrites, especially alpha,omega-dinitriles to alpha,omega-aminonitriles or alpha,omega-diamines, as catalytically active component in heterogeneous catalysts.

The heterogeneous catalysts are preferably used in the hydrogenation of adiponitrile to hexamethylenediamine and the partial hydrogenation of adiponitrile to 6-aminocapronitrile and hexamethylenediamine.

If the catalyst is used for the synthesis of ammonia from nitrogen and hydrogen or for the production of hydrocarbons from synthesis gas (Fischer-Tropsch synthesis), the heterogeneous catalyst may, after activation, be advantageously washed with solvents, such as alcohols, hydrocarbons, amines, ammonia or ether, and if appropriate dried.

If the catalyst is used for the hydrogenation of nitrites, the nitrile to be reacted over the activated catalyst may advantageously be used during the activation in the process of the invention.

EXAMPLE 1

All % ages in the example are by weight, unless otherwise stated.

a) Activation of Reducedly Passivated Iron

The catalyst precursor was prepared by melting a magnetite ore in air at above 1550° C. The magnetite ore used had the following composition:

72% of Fe, 0.08% of Al, 0.03% of Ca, 0.05% of Mg, 0.12% of Si, 0.01% of Ti, 0.17% of Mn, balance oxygen.

The cooled melt block was comminuted in a jaw crusher. A sieve fraction of particle size 1.5–3 mm was separated out by sieving and reduced in a hydrogen/nitrogen stream at 450° C. in the course of 72 hours. After cooling down to room temperature under nitrogen, the catalyst was passivated with a mixture of 1% of air with nitrogen in the course of 24 hours, care being taken to ensure that the temperature of the bed hot spot did not exceed 45° C.

In a 270 ml autoclave, 80 g of reducedly [sic]/passivated catalyst spall was installed in a wire cage and the autoclave was sealed. 69 g of ammonia and 34.5 g of ACN were then introduced, the autoclave was heated to 110° C. and hydrogen was pressed in via a 2000 rpm sparging stirrer to a total pressure of $250*10^5$ Pa. After about an hour, the hydrogen uptake started, the rate of uptake rising almost linearly with time until the nitrites had been completely converted. Samples were taken during the reaction, and it was determined that ACN is completely converted into HMD and ACSA (Tab. 1).

ACN = 6-aminocapronitrile
HMD = hexamethylenediamine
ACSA = 6-aminocaproamide
ADN = adiponitrile

TABLE 1

| Reaction time (min) | ACN (area %) | HMD (area %) | ACSA (area %) |
|---|---|---|---|
| 70 | 96.22 | 1.10 | 2.10 |
| 135 | 61.02 | 30.93 | 6.92 |
| 195 | 2.95 | 86.89 | 8.80 |
| 255 | 0.54 | 89.36 | 8.76 |
| 360 | 0.17 | 89.73 | 8.73 |

Table 1 shows that the water formed reacts with ACN to form ACSA.

b) Hydrogenation of Adiponitrile to Hexamethylenediamine

The catalyst prepared according to 1 a) by activation of reduced-passivated iron catalyst was used in the same reactor for hydrogenating adiponitrile to hexamethylenediamine. Unlike 1a), the reactor was operated continuously. The hydrogenation was carried out at 135° C., $250*10^5$ Pa and a catalyst space velocity of 1.0 kg of ADN/l of cat. ×h. A mixture of ammonia and ADN in a weight ratio of 2:1 was fed into the reactor continuously. During a period of 100 hours samples were taken and analyzed by gas chromatography, revealing a hexamethylenediamine yield of 99% coupled with complete ADN conversion.

We claim:

1. A process for hydrogen activation of passivated iron useful as catalytically active component after said activation at an elevated pressure, which comprises providing a passivated iron catalyst precursor comprising metallic iron, and activating said catalyst precursor in the presence of a nitrile at from 20 to 180° C.

2. A process as claimed in claim 1, wherein said catalyst precursor is activated at from 2 to 40 MPa.

3. A process as claimed claim 1, wherein the nitrile used is an aliphatic nitrile.

4. A process as claimed in claim 1, wherein the nitrile used is a compound selected from the group consisting of adiponitrile and 6-aminocapronitrile.

5. The process of claim 1, wherein said catalyst precursor comprises metallic iron and optionally one or more constituents selected from the group consisting of: carriers, promoter elements, compounds based on promoter elements, compounds based on alkali metals and compounds based on alkaline earth metals.

6. The process of claim 1, wherein the nitrile is employed as a nitrile solution having a nitrile concentration of from 10 to 90% by weight.

7. The process of claim 1, wherein said catalyst precursor is employed in an amount of from 1 to 50% by weight, based on the weight of the nitrile.

* * * * *